United States Patent [19]
Vilmur

[11] Patent Number: 5,950,131
[45] Date of Patent: Sep. 7, 1999

[54] METHOD AND APPARATUS FOR FAST PILOT CHANNEL ACQUISITION USING A MATCHED FILTER IN A CDMA RADIOTELEPHONE

[75] Inventor: Richard J. Vilmur, Palatine, Ill.

[73] Assignee: Motorola, Inc., Schaumburg, Ill.

[21] Appl. No.: 08/741,183

[22] Filed: Oct. 29, 1996

[51] Int. Cl.[6] .............................. H04Q 7/32; H04J 13/04; H04L 27/32
[52] U.S. Cl. ......................... 455/434; 455/442; 370/332; 370/335; 375/207
[58] Field of Search .................................. 455/434, 515, 455/442; 375/207, 343; 370/335, 342, 332

[56] References Cited

U.S. PATENT DOCUMENTS

| | | | |
|---|---|---|---|
| 5,109,390 | 4/1992 | Gilhousen et al. | 370/335 |
| 5,179,571 | 1/1993 | Schilling | 37/331 |
| 5,267,261 | 11/1993 | Blakeney, II et al. | 370/332 |
| 5,311,544 | 5/1994 | Park et al. | 375/206 |
| 5,410,568 | 4/1995 | Schilling | 375/205 |
| 5,469,469 | 11/1995 | Haines | 375/201 |
| 5,490,165 | 2/1996 | Blakeney, II et al. | 375/205 |
| 5,544,156 | 8/1996 | Teder et al. | 370/342 |
| 5,703,873 | 12/1997 | Ojanpera et al. | 370/335 |
| 5,715,276 | 2/1998 | Tran et al. | 375/207 |

FOREIGN PATENT DOCUMENTS

| | | |
|---|---|---|
| 0 615 355 A2 | 9/1994 | European Pat. Off. . |
| 0 756 391 A1 | 1/1997 | European Pat. Off. . |
| 3834457 C2 | 4/1989 | Germany . |
| 4425354 A1 | 2/1995 | Germany . |
| 5-344093 | 12/1993 | Japan . |
| 8-111653 | 4/1996 | Japan . |
| WO 96/37968 | 11/1996 | WIPO . |

OTHER PUBLICATIONS

R. C. Dixon, "Integrate–and–Dump Filters", *Spread Spectrum Systems*, 2nd Edition, John Wiley & Sons, 1984, pp. 203–204.

R. C. Dixon, "Matched–Filter Synchronizers", *Spread Spectrum Systems*, 2nd Edition, John Wiley & Sons, 1984, pp. 229–234.

K. Higuchi et al., "Two–Stage Rapid Cell Search Scheme in DS–CDMA Asynchronous Cellular System using Long Code", Technical Report of IEICE, NTT Mobile Communications Network, Aug. 1996, pp. 51–56.

R. L. Peterson et al., Section 5–1, *Introduction to Spread–Spectrum Communications*, Prentice–Hall, Inc., 1995, pp. 221–223.

D. L. Schilling, Unpublished Paper, "A Matched Filter–Based Wideband CDMA Implementation", Jul. 1996, pp. 1–16.

G. L. Turin. "An Introduction to Digital Matched Filters", *Proceedings of the IEEE*, Jul. 1976, pp. 1092–1112.

G. L. Turin, "An Introduction of Matched Filters", *IEEE Transactions on Information Theory*, Jun. 1960, pp. 310–329.

R. B. Ward et al., "Acquisition of Pseudonoise Signals by Recursion–Aided Sequential Estimation", *IEEE Transactions on Communications*, vol. Com–25, No. 8, Aug. 1977, pp. 784–794.

R. B. Ward, "Acquisition of Pseudonoise Signals by Sequential Estimation", *IEEE Transactions on Communication Technology*, Dec. 1965, pp. 475–483.

TIA/EIA Interim Standard, Mobile Station–Base Station Compatibility Standard for Dual–Mode Wideband Spread Spectrum Cellular System, TIA/EIA/IS–95, Telecommunications Industry Association, Jul. 1993, pp. 7–2 & 7–18.

*Primary Examiner*—Andrew M. Dolinar
*Attorney, Agent, or Firm*—John G. Rauch; Brian M. Mancini

[57] ABSTRACT

Performance of a radiotelephone (104) in a CDMA communication system (100) is enhanced using a receiver searcher (114) that includes a matched filter (128) to capture the pilot energies of all receivable transmissions from a base station (102) and other nearby base stations. A detected PN sequence is compared with a predetermined PN sequence stored at the radiotelephone (104). The predetermined PN sequence includes, for example, the last 512 chips in the short PN sequence used for spreading the in-phase channel and the quadrature-phase channel.

26 Claims, 5 Drawing Sheets

METHOD AND APPARATUS FOR FAST PILOT CHANNEL ACQUISITION USING A MATCHED FILTER IN A CDMA RADIOTELEPHONE

FIELD OF THE INVENTION

The present invention relates generally to digital communication. More particularly, the present invention relates to a method and apparatus for pilot channel acquisition in a spread spectrum communication system such as a code division multiple access (CDMA) cellular telephone system.

BACKGROUND OF THE INVENTION

Direct sequence code division multiple access (DS-CDMA) communication systems have been proposed for use in cellular telephone systems operating at 800 MHz and in the personal communication system (PCS) frequency band at 1800 MHz. In a DS-CDMA system, all base stations in all cells may use the same radio frequency for communication. Base stations are uniquely identified in the system by uniquely-assigned spreading codes. Two specified pseudorandom noise (PN) sequences of $2^{15}$ bits length are used by all the base stations. In a quadrature modulated system, one sequence is used for the in-phase (I) channel spreading of the I channel symbols and the other is used for the quadrature (Q) channel spreading of the Q channel symbols. Mobile stations in the system possess the same two $2^{15}$ bits length spreading codes and use them for the initial de-spread of the I and Q channels.

Before the spreading on the I and Q channels, the symbols for transmission are spread using one row of a dimension-64 Hadamard matrix, a process known as Walsh covering. When in a call, each mobile station is assigned a unique Walsh code by the base site to ensure that transmission to each mobile station within a given cell is orthogonal to transmission to every other mobile station, assuming that a different row of the Hadamard matrix is used for each mobile station. In this manner, traffic channels are established for two-way communication between a base station and a mobile station.

In addition to traffic channels, each base station broadcasts a pilot channel, a synchronization channel, and a paging channel. The pilot channel is formed by a constant level signal that is covered by Walsh code 0, which consists of all zeros. The pilot channel is commonly received by all mobile stations within range and is used by the mobile station for identifying the presence of a CDMA system, initial system acquisition, idle mode hand-off, identification of initial and delayed rays of communicating and interfering base stations, and for coherent demodulation of the synchronization, paging, and traffic channels.

Since all base stations use the same PN sequences to spread the I and Q channels, the base stations are uniquely identified by using a unique starting phase, also referred to as a starting time or phase shift, for the PN sequences. The sequences are produced at a chip rate of 1.2288 Mega-chips per second and thus repeat every 26⅔ milliseconds. The minimum time separations are 64 chips in length allowing a total of 512 different PN code phase assignments for the base stations. Other allowed time separations are 64 chips times multiples of two.

At the mobile station, the received RF signals include pilot, synchronization, paging, and traffic channels from all nearby base stations. The mobile station must identify all the pilot signals that are receivable including the pilot signal from the base station with the strongest pilot channel. In prior art mobile stations, a correlator has been used as a receiver pilot searching element to serially search for the PN phases of the receivable pilots. Knowledge of the correct I and Q channel spreading PN phases of the base site(s) with which the mobile station communicates allows the coherent detection of all the other code channels transmitted by the base station. Incorrect I and Q channel spreading PN phases will produce no output from the correlator when used to demodulate the remaining code channels.

Because the I and Q channel spreading PN sequence phase space is large, the prior art serial correlation technique has taken a prohibitively long time to correctly locate pilot signal energy. At a minimum, with strong signals, system acquisition upon powering up the mobile station takes 2.5 seconds. With no receivable pilots present, the mobile station will continue to search the entire phase space of the I and Q channel PN sequences until a system time out occurs which may be 15 seconds. Then the mobile station may move to another RF frequency and again attempt to acquire the CDMA system. This makes it important to quickly identify whether CDMA pilots are receivable on any possible RF channel assignment.

The long time delay in system acquisition is inconvenient and undesirable for most users. A user turning on a radiotelephone expects to be able to use the radiotelephone immediately, with minimal delay. A delay of even 2.5 seconds is too long for many users and longer delays could have serious consequences, for example, for emergency "911" calls. Because of the prior art method of correlating all the spreading PN sequence phases, the long delay is inherent in prior art DS-CDMA mobile stations.

The prior art pilot channel searching method creates further limitations for all of the other uses of the pilot channel after initial system acquisition. Typical DS-CDMA mobile station receivers utilize a rake receiver having three or more independently controlled fingers which are time aligned to the correct PN sequence phases using knowledge of the pilot channel phases determined by the receiver pilot phase searching element. The rake fingers are normally assigned to the strongest rays received from all communicating base stations as determined by the receiver pilot phase searching element. Ray assignments are updated in a maintenance process using the pilot phase searching element information. If the pilot phase searching element is slow, resulting in slow maintenance of the assignment of the strongest rays to the rake fingers, the receiving performance of the mobile station is degraded under fading conditions.

Idle hand-off is the process of attaching to and listening to the paging channel of the base station with the strongest pilot as identified by the pilot searching element When the mobile station receives a page or accesses the system to place a call, it is important that the mobile station is listening to the page from or tries to access the base station associated with the strongest received pilot. This requires a fast pilot phase searching element, particularly when the mobile station is in motion.

For battery powered portable mobile stations it is also very important to conserve battery charge when waiting for pages. DS-CDMA provides a slotted mode that allows portable stations to power down except for the periods when their assigned paging slot information is transmitted by the base stations The paging slot interval can be as short as 1.28 seconds and periods of 1.28 seconds multiplied by powers of two for more battery savings. During these intervals, the mobile station "sleeps" in a low power mode.

A portable station may have to search the possible phase space of as many as twenty base stations every time it wakes up. To reliably receive the paging slot after waking up, the portable station must be listening to the base station which is providing adequate signal strength. When the mobile station is in motion, the correct base station to decode can easily change from one paging interval to the next paging interval. Therefore it is very important to have a fast pilot searching mechanism to identify the correct base station pilot before the start of the assigned paging slot. Using the prior art pilot searching mechanism requires the portable station to wake up well before the paging slot to allow sufficient time to sequentially search the PN sequence phase space. This negates a substantial part of the potential battery savings afforded by slotted mode.

The poor performance of the prior art searching mechanism also affects soft handoff performance of the mobile station. When in a call on a traffic channel, the prior art pilot searching mechanism is used to maintain the proper rake finger assignments for optimum demodulation of the traffic channel and to identify interfering base sites. If an interfering base site is found, it is reported by the mobile station to the base site as a candidate for soft hand-off. Soft hand-off is a DS-CDMA system condition where a mobile station is communicating with more than one base site simultaneously. When a mobile station is in motion, the prior art searching mechanism at times is too slow in either rake finger optimization or identifying new strong interfering base sites causing excessive communications errors and possibly a dropped call from sudden strong interference as can happen when turning a corner around an RF blocking structure.

Accordingly there is a need for a fast and accurate pilot searching mechanism that will improve mobile station performance for identifying the presence of a DS-CDMA system using pilot channels, initial system acquisition, idle mode hand-off, slotted mode battery savings, and identification of initial and delayed rays of communicating and interfering base stations for the purposes of coherent demodulation of the synchronization, paging, and traffic channels and soft hand-off.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
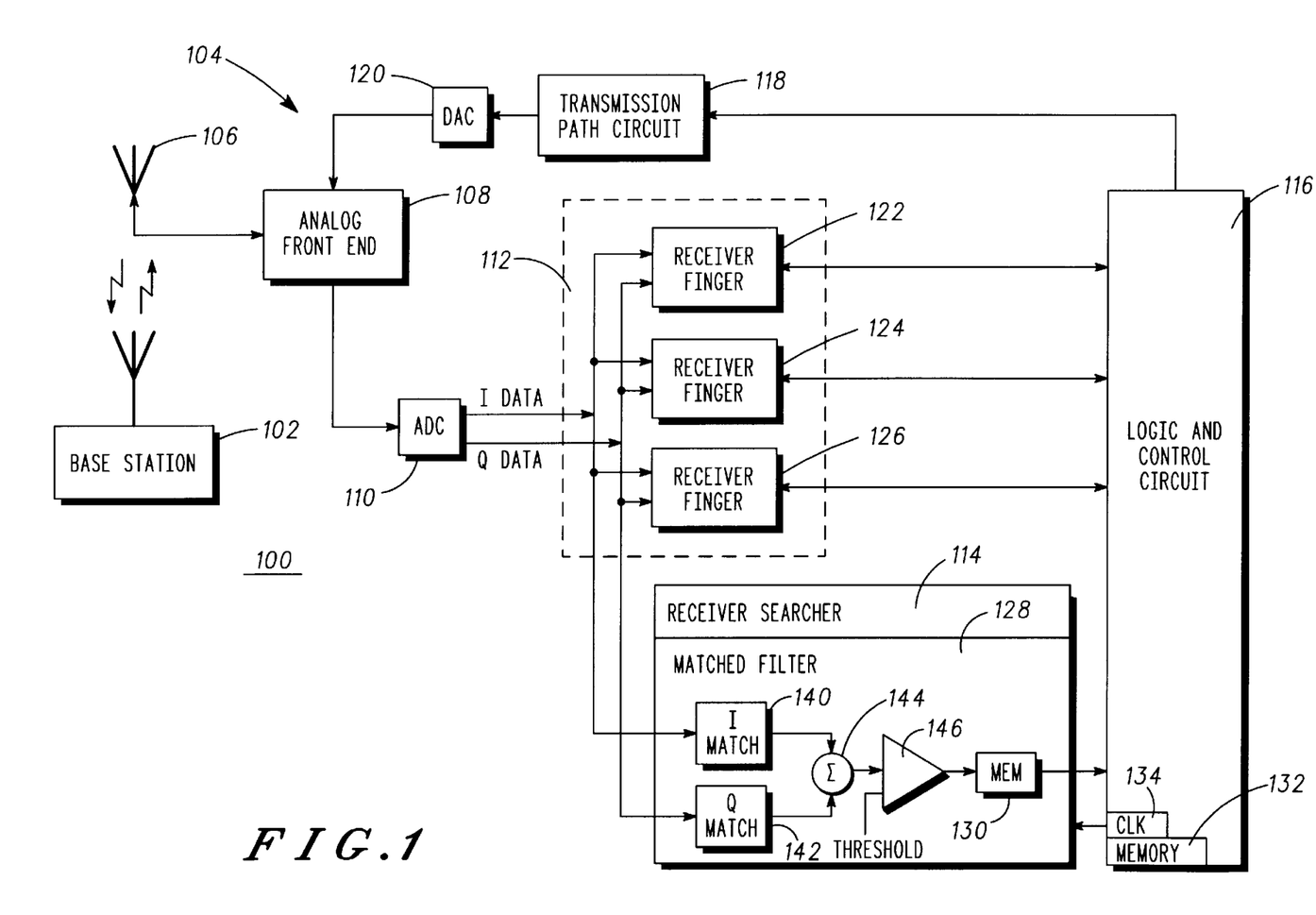
FIG. 1 is a block diagram of a CDMA communication system.

Referring now to FIG. 1, a communication system 100 includes a plurality of base stations such as base station 102 configured for radio communication with one or more mobile stations such as radiotelephone 104. The radiotelephone 104 is configured to receive and transmit direct sequence code division multiple access (DS-CDMA) signals to communicate with the plurality of base stations, including base station 102. In the illustrated embodiment, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems including PCS systems at 1800 MHz.

The base station 102 transmits spread spectrum signals to the radiotelephone 104. The symbols on the traffic channel are spread using a pseudorandom noise (PN) Walsh code in a process known as Walsh covering. Each mobile station such as the radiotelephone 104 is assigned a unique Walsh code by the base station 102 so that the traffic channel transmission to each mobile station is orthogonal to traffic channel transmissions to every other mobile station. The spread signals are quadrature modulated to form in-phase (I) and quadrature-phase (Q) signals. The I and Q signals are each spread using two specified PN sequences $2^{15}$ bits in length. The same I and Q spreading sequences are used by all base stations in the communication system 100.

In addition to traffic channels, the base station 102 broadcasts a pilot channel, a synchronization channel and a paging channel. The pilot channel is formed by a constant level signal that is covered by Walsh code 0, which consists of all zeros. The pilot channel is commonly received by all mobile stations within range and is used by the radiotelephone 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the radiotelephone 104.

Since all base stations use the same PN sequences to spread the I and Q channels, the base station 102 and all base stations in the communication system 100 are uniquely identified by using a unique starting phase, also referred to as a starting time or phase shift, for the I and Q PN sequences. The sequences are produced at a chip rate of 1.2288 Mega-chips per second and thus repeat every 26⅔ milliseconds. The minimum permitted time separation is 64 chips, allowing a total of 512 different PN code phase assignments. The spread I and Q channels modulate a radio frequency (RF) carrier and are transmitted to all mobile stations including the radiotelephone 104 in a geographic area served by the base station 102.

The radiotelephone 104 comprises an antenna 106, an analog front end 108, a receive path including an analog to digital converter (ADC) 110, a rake receiver 112 and a receiver searcher 114, a controller 116, and a transmit path including a transmission path circuit 118 and a digital to analog converter (DAC) 120. The antenna 106 receives RF signals from the base station 102 and from other base stations in the vicinity. Some of the received RF signals are directly transmitted, line of sight rays transmitted by the base station. Other received RF signals are reflected rays and are delayed in time.

Received RF signals are converted to electrical signals by the antenna 106 and provided to the analog front end 108.

The analog front end 108 filters the signals and provides conversion to baseband I and Q signals. The analog baseband I and Q signals are provided to the ADC 110, which converts them to streams of I and Q digital data for further processing.

The rake receiver 112 has a plurality of receiver fingers, including receiver finger 122, receiver finger 124 and receiver finger 126. In the illustrated embodiment, the rake receiver 112 includes three receiver fingers. However, any suitable number of receiver fingers could be used. The receiver fingers are of conventional design. In a manner to be described below, the receiver fingers of the rake receiver 112 are controlled by the controller 116. The controller 116 includes a memory 132 and a clock 134. The clock 134 controls timing of the radiotelephone 104. For example, the clock 134 establishes a chip clock signal to control timing of the processing of received PN sequences throughout the radiotelephone 104. The chip clock signal is preferably twice the chip rate.

The receiver searcher 114 detects pilot signals received by the radiotelephone 104 from the plurality of base stations including the base station 102. In accordance with the invention, the receiver searcher 114 includes a matched filter 128 and a memory 130. The matched filter 128 compares a detected I and Q PN sequence received from the ADC 110 and predetermined PN sequences stored in the memory and produces a response. In the illustrated embodiment, the predetermined PN sequences are stored in the memory 130.

The matched filter 128 receives the I and Q streams of data from the ADC 110. The data correspond to the spread, quadrature modulated signal received from the base station 102, including directly received or initial rays and reflected rays having a time delay. In addition, the data correspond to spread, quadrature modulated signals, direct and reflected, received from other base stations in the communication system 100. The data includes the PN sequences used for spreading the I and Q channels at the base station 102 and at all other base stations.

The matched filter 128 compares the detected I and Q PN sequences with predetermined PN sequences. The predetermined FN sequences correspond to a portion of the $2^{15}$ element short PN sequences used to spread the I and Q channels at all base stations. The radiotelephone 104 includes a storage element such as the memory 130 or the memory 132 which stores a fixed pattern of PN values. The predetermined FN sequence includes the fixed pattern. In one embodiment, the fixed pattern comprises a predetermined number of chips of a PN sequence, for example the 512 last chips of a PN sequence such as the short PN sequence. In another embodiment, the controller 116 provides a variable pattern to the receiver searcher 114. The variable pattern comprises a predetermined number of chips of a PN sequence, such as the 512 last chips of a PN sequence.

In the illustrated embodiment, the pilot signals are quadrature modulated, with each of the pilot signals including in-phase (I) symbols and quadrature-phase (Q) symbols. The I symbols are spread using an I PN sequence and the Q symbols are spread using a Q PN sequence. The matched filter 128 accordingly includes an I filter 140 for comparing a detected I PN sequence and a stored I PN sequence and a Q filter 142 for comparing a detected Q PN sequence and a stored Q PN sequence and producing the response. In one embodiment, a portion of the stored I PN sequence comprises a first fixed pattern and a portion of the stored Q PN sequence comprises a second fixed pattern. For example, the first fixed pattern comprises 512 last chips of an I PN sequence and the second fixed pattern comprises 512 last chips of a Q PN sequence, such as the $2^{15}$ element short PN sequence.

The I filter 140 and the Q filter 142 each produce a response. Either or both of the I filter 140 and Q filter 142 responses may be used as the response of the matched filter 128. Use of both responses improves the quality of the response of the matched filter 128. In the illustrated embodiment, summing element 144 combines the response of the I filter 140 and the response of the Q filter 142 to produce the response of the matched filter 128. A comparator 146 suppresses the response when the response does not exceed a predetermined threshold. For example, the matched filter will continuously produce the response, even if no CDMA system is present or if only noise is present The threshold is set to a predetermined value to prevent storage of the response in the memory 130 when is no meaningful input symbols are received.

The matched filter 128 provides a response to the comparison of the detected PN sequence and the predetermined PN sequence. The response is stored, for example in memory 130 or memory 132. In the illustrated embodiment, the response is double buffered. That is, the matched filter 114 stores the response in a first set of memory locations (such as memory 130) as the response is determined The controller 116 reads the stored response from a second set of memory locations (such as memory 132). Each memory contains 26⅔ ms of response values. After each 26⅔ ms search period, the contents of the first set of memory locations are transferred to the second set of memory locations and the contents of the first set of memory locations are overwritten with new data.

As will be discussed in further detail below, the controller 116 and the receiver searcher 114 including the matched filter 128 is used for identifying the presence of a DS-CDMA system using pilot channels, initial system acquisition, idle mode hand-off, slotted mode battery savings, and identification of initial and delayed rays of communicating and interfering base stations for the purposes of coherent demodulation of the synchronization, paging, and traffic channels and soft hand-off.

The controller 116 determines the presence of DS-CDMA signals based on the response. Also, in the illustrated embodiment, the controller 116 is configured to identify a strongest DS-CDMA pilot signal based on the response. The controller initiates communication with a base station identified by the strongest DS-CDMA pilot signal.

In the illustrated embodiment, the radiotelephone is maintained in a low-power mode (referred to as sleep mode or slotted mode battery savings), periodically interrupted by an active mode. The controller identifies a strongest DS-CDMA pilot signal based on the response upon entering the active mode.

In some applications, the radiotelephone 104 is in an area where it will receive both initial rays and reflected or time delayed rays. The receiver searcher 114 of the illustrated embodiment is configured to detect one or more rays originating from a base station. The controller 116 identifies one or more strongest rays based on the response, the controller assigning respective receiver fingers of the rake receiver 112 to the one or more strongest rays. Also, the controller 116 is configured to identify a strongest ray from a base station based on the response. The controller 116 assigns a receiver finger of the rake receiver 112 to the strongest ray. Subsequently, from the same response, the controller 116 identifies zero or more strong rays from the base station and assigns zero or more respective receiver fingers to the zero or more strong rays.

In other applications, the radiotelephone 104 is located in an area where it receives pilot channel energy from more than a single base station. The receiver searcher 114 is configured to detect a plurality of pilot signals from a like plurality of base stations, the controller 116 identifying two or more strongest pilot signals based on the response. The controller 116 assigns respective receiver fingers of the rake receiver 112 to the two or more strongest rays for controlling soft handoff while on a traffic channel.

Figure 2:
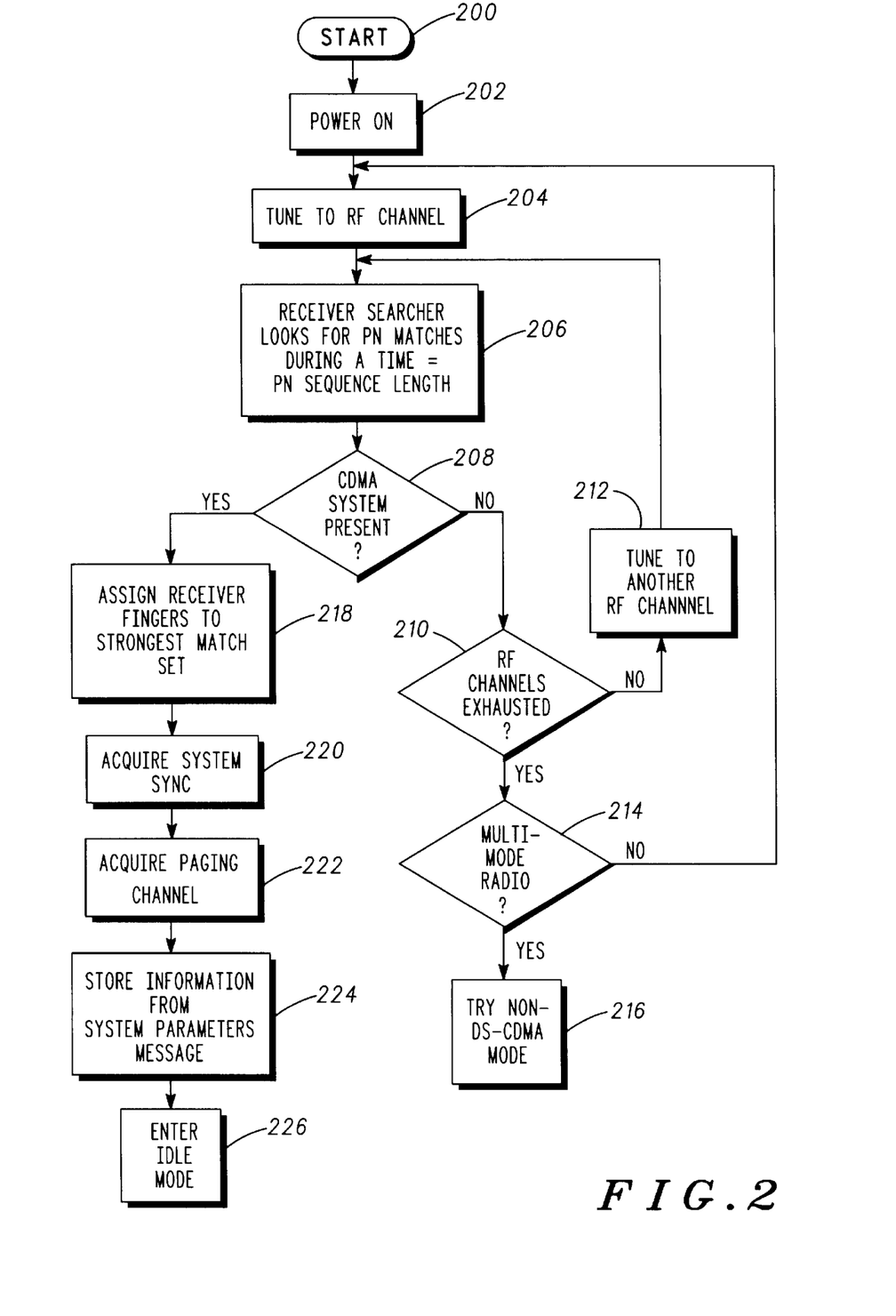
FIG. 2 is a flow diagram illustrating operation of the CDMA communication system of FIG. 1 during system acquisition.

Referring now to FIG. 2, it shows a flow diagram illustrating a method of operating the CDMA communication system 100 of FIG. 1 during system acquisition. The method begins at step 200. At step 202, operation of the radiotelephone 104 is initiated. For example, operating power to the radiotelephone 104 is turned on or the radiotelephone 104 in some way enters the communication system 100. At this point, the radiotelephone 104 attempts to identify and acquire the system.

At step 204, the radiotelephone 104 tunes to an RF channel. The analog front end 108 is used for selecting a particular RF channel. The RF channel may be predefined by the communication system 100 according to a system protocol, such as IS-95. Alternatively, the RF channel may be located somewhere in one or more ranges of frequencies, as is the case in many PCS systems operating around 1800 MHz.

At step 206, the receiver searcher 114 looks for PN matches. The receiver searcher 114, under control of the controller 116, examines the stream of received data provided by the ADC 110. The data includes detected PN sequences corresponding to spread RF signals received from one or more base stations, such as base station 102. The matched filter 128 compares detected PN sequences and a predetermined PN sequence and produces a response. The response may be stored in the memory 130 or the memory 132, or elsewhere. The predetermined PN sequence is maintained at the radiotelephone 104, for example in the memory 130 or the memory 132. The predetermined PN sequence is, for example, 512 chips long. The matched filter 128 captures the pilot energies of all receivable base transmissions during a predetermined time duration. The preferred predetermined time duration for an IS-95 DS-CDMA communication system such as communication system 100 is 26⅔ milliseconds, which is the time required for repeat of all phases of the PN sequences used to spread the I and Q channels The matched filter 128 may examine either the I channel or the Q channel, Alternatively, the matched filter 128 could include an I channel matched filter for the I channel and a Q channel matched filter for the Q channel, combining the outputs of the two matched filters for improved accuracy.

At step 208, the radiotelephone 104 determines if a DS-CDMA system is present. The controller 116 examines the response produced by the matched filter 128. If a DS-CDMA system is present, the response will include a strong match indication corresponding to the phase of a base station in the vicinity of the radiotelephone 104. The response may include a match set, which is two or more closely clustered strong match indications. These strong match indications correspond to multiple strong rays received from a single base station, delayed in time. The match set will be within a predefined chip distance (i.e., time) of each other, such as 25 chips. Presence of a single strong match indication or a match set indicates a DS-CDMA system is present.

If no DS-CDMA system is present, at step 210, the radiotelephone 104 determines if all RF channels have been exhausted. In some DS-CDMA systems, two or more RF channels are predefined for system acquisition. If not all have been examined for CDMA energy, at step 212 the radiotelephone 104 tunes to another RF channel and control returns to step 206 to detect pilot signals by the matched filter 128.

If all RF channels are exhausted at step 210, at step 214 it is determined if the radiotelephone 104 is a multimode radio. For some applications, the radiotelephone 104 may include circuitry necessary to operate in systems other than a DS-CDMA system such as communication system 100. Other possible systems include AMPS (Advanced Mobile Phone Service) systems, GSM (Global System for Mobile communication) systems, TDMA (time division multiple access) systems such as the North American Digital Cellular, or Japan Digital Cellular systems, satellite systems, such as the Iridium system proposed by Iridium, LLC, or cordless systems such as DECT (Digital Extended Cordless Telephone) or PHS (Personal Handyphone System). If the radiotelephone 104 is not a multimode radio, control returns to step 204 to continue searching for a CDMA system. Alternatively, the method times out or otherwise terminates to conserve battery power in the radiotelephone 104. If the radiotelephone 104 is a multimode radio, at step 216, the radiotelephone 104 attempts to locate a non-DS-CDMA system.

If, at step 208, the radiotelephone 104 determines that a CDMA system is present, the controller 116 assigns receiver fingers to either the strongest ray or the strongest match set. If a single ray has been identified, a single receiver finger such as receiver finger 122 will be assigned to the ray to receive the ray. If multiple rays have been identified, multiple receiver fingers such as receiver finger 122 and receiver finger 124 will be assigned to the rays to receive the rays.

At step 220, the radiotelephone 104 detects the synchronization channel and acquires system synchronization. In response to the synchronization channel, timing of the radiotelephone 104 is synchronized to the timing of the base station which transmitted the synchronization channel. At step 222, the radiotelephone 104 acquires the paging channel broadcast by the base station. The paging channel includes system information, referred to as a System Parameters Message, intended for all mobile stations in communication with the base station. The paging channel may also include a page or other information directed to the radiotelephone 104. At step 224, the data in the System Parameters Message is stored and at step 226, the radiotelephone 104 enters idle mode. In idle mode, the radiotelephone is monitoring RF signals received from a base station including one or more rays and assigning receiver fingers to the strongest received rays for the purpose or receiving the paging channel.

Figure 3:
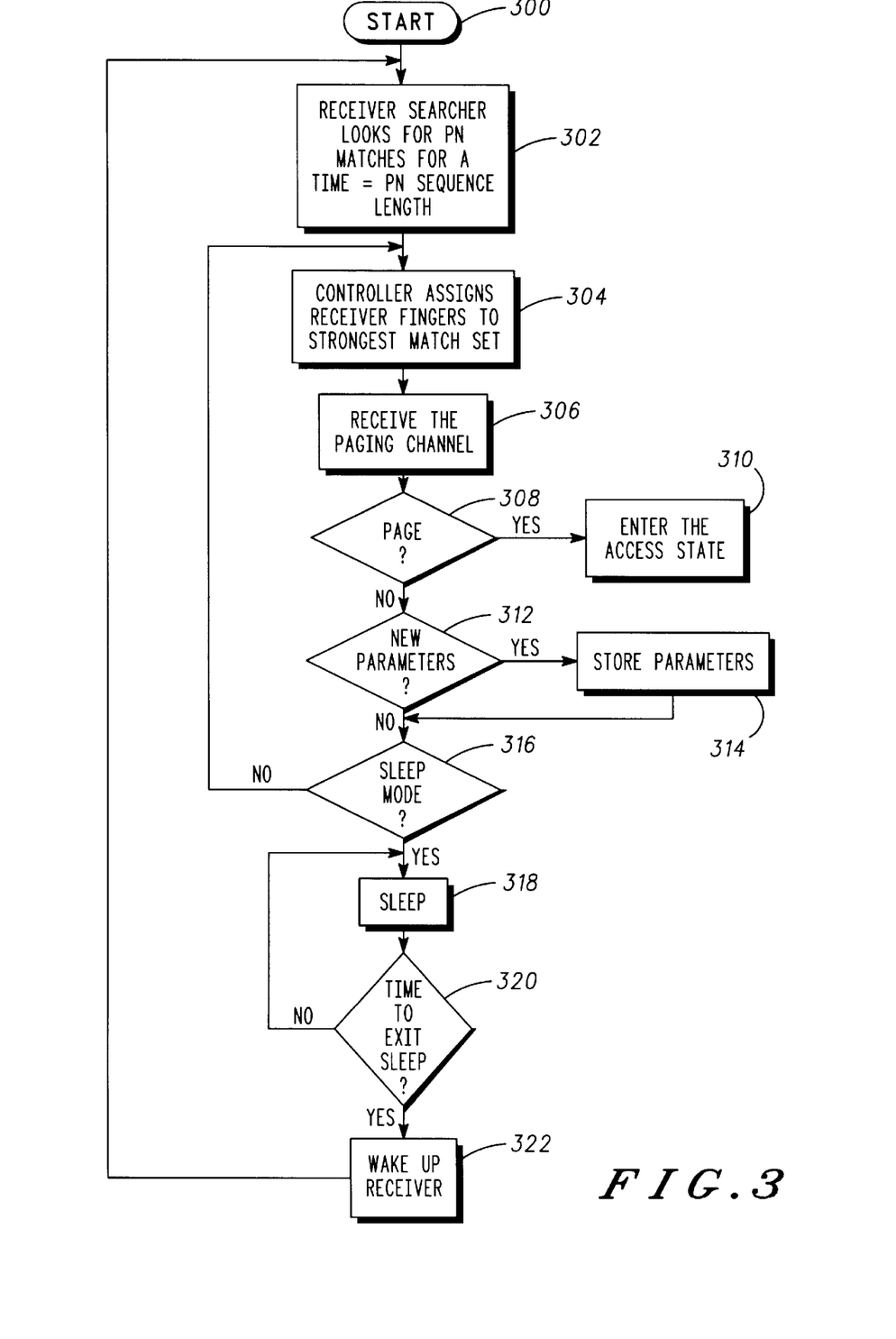
FIG. 3 is a flow diagram illustrating operation of the CDMA communication system of FIG. 1 during idle mode.

Referring now to FIG. 3, it is a flow diagram illustrating a method of operating the CDMA communication system of FIG. 1 during idle mode. The method begins at step 300.

At step 302, the receiver searcher 114 looks for PN matches in the received data stream provided by the ADC 110. In the illustrated embodiment, the receiver searcher 114 applies the received data stream to the matched filter 128 for a time duration equal to 26⅔ milliseconds, the time required for repeat of all phases of the PN sequences used to spread the I and Q channels. The matched filter 128 compares the detected PN sequences in the received data stream to a predetermined PN sequence and stores the result of the comparison as a response. The response is stored in the memory 130 or the memory 132. The response is continually updated, and therefore may be double buffered, with the matched filter 128 writing the response from the current search to one set of memory locations and the controller 116 reading the response from the latest search from another set of memory locations. Operation of the receiver searcher 114 may be continuous and independent of the operation of the rest of the method illustrated in FIG. 3.

At step 304, the controller 116 examines the stored response. The controller 116 controls the plurality of receiver fingers, including receiver finger 122, receiver finger 124 and receiver finger 126, in response to the stored response. Specifically, the controller 116 assigns receiver fingers to the strongest match set of the latest search response. The match set may include one or more strongest rays transmitted by a single base station.

At step 306, the radiotelephone 104 receives the paging channel broadcast by the base station. At step 308, the radiotelephone 104 determines if the paging channel includes a page addressed for the radiotelephone 104. If so, at step 310, the radiotelephone 104 enters the access state and begins two-way communication with the base station. Such operation is according to the communication protocol, such as IS-95, which controls the communication system 100. If the paging channel does not include a page for the radiotelephone 104, at step 312 the radiotelephone 104 determines if the paging channel includes new parameters for controlling the system. If so, at step 314, the parameters are stored at the radiotelephone 104 and control continues at step 316. If no new parameters are included in the paging channel, control proceeds directly to step 316.

At step 316, the radiotelephone determines if it should enter sleep mode. Sleep mode is a low-power mode for reducing battery consumption, thereby extending battery life. In sleep mode, high-power circuit elements such as the analog front end 108, the ADC 110, the rake receiver 112, the transmission path circuit 118 and the DAC 120 (FIG. 1) are powered down. If the radiotelephone 104 is not to enter sleep mode, control returns to step 304 and the controller 116 again examines the latest search response stored by the receiver searcher 114 and assigns receiver fingers accordingly. Alternatively, at step 318, the radiotelephone enters sleep mode for a predetermined time. In accordance with IS-95, sleep mode continues for a duration of 1.28 seconds, or powers of two multiples thereof.

At step 320, the radiotelephone 104 determines if it should exit sleep mode. A sleep timer is maintained to time the duration of sleep mode. If the timer has elapsed, control proceeds to step 322 and the radiotelephone 104 wakes up the analog front end 108 and the receive path including the ADC 110, rake receiver 112 and the receiver searcher 114. These elements are "awakened" by applying power to them. Control then returns to step 302 and the receiver searcher 114 attempts to locate pilot energy. If it is not yet time to exit sleep mode, control returns to step 318 and the radiotelephone remains in sleep mode.

Figure 4:
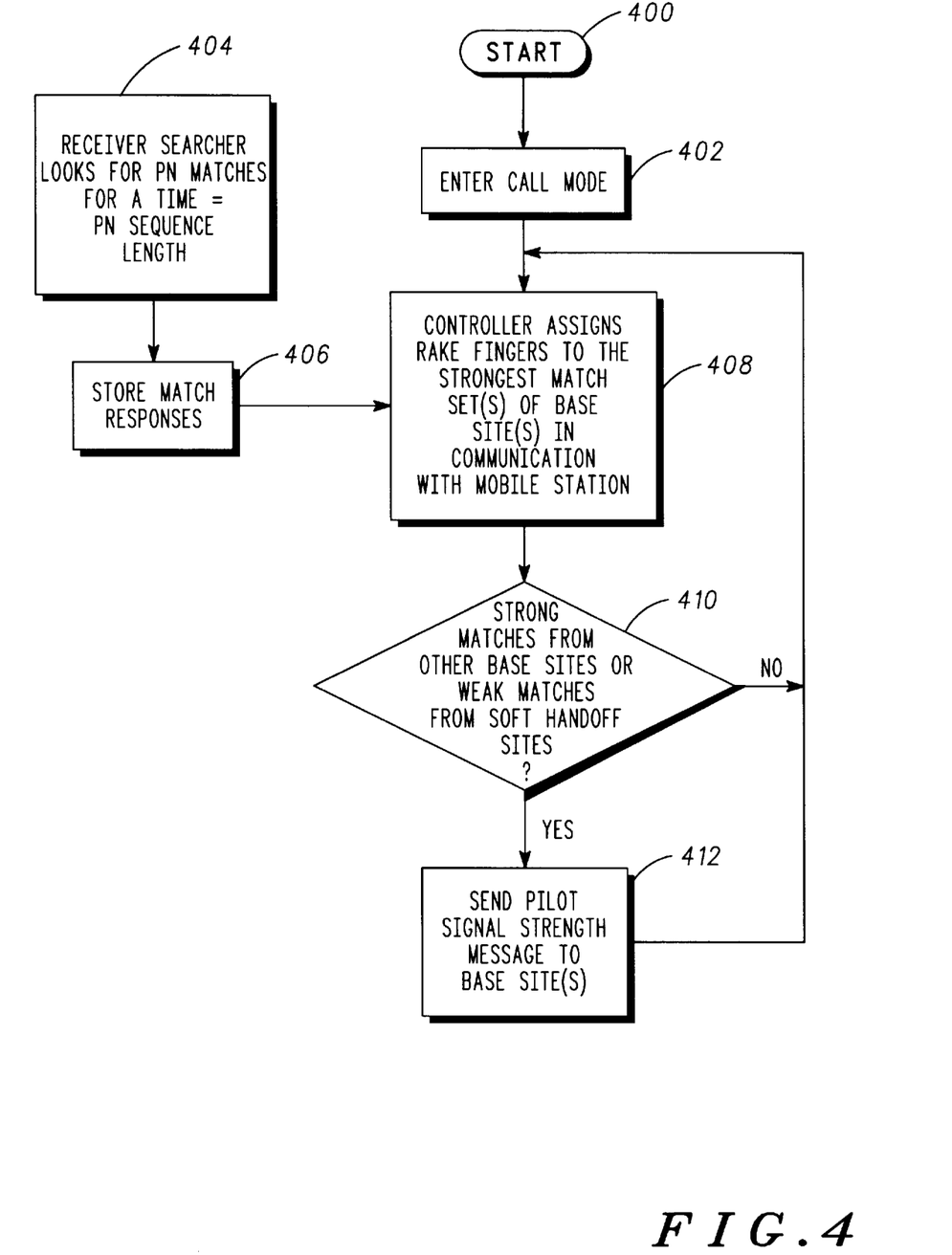
FIG. 4 is a flow diagram illustrating operation of the CDMA communication system of FIG. 1 during call mode.

FIG. 4 is a flow diagram illustrating operation of the CDMA communication system 100 of FIG. 1 during call mode. In call mode, the radiotelephone 104 and the base station 102 are in two-way communication using a traffic channel. In addition, the radiotelephone 104 is monitoring the pilot signals of other base stations in the vicinity to initiate the process of soft handoff by reporting base stations with strong pilot signals. In soft handoff, the radiotelephone is in communication with more than one base station. The system uses the pilot signal strength reports to determine if a soft handoff should be set up, maintained or torn down.

The method begins at step 400. At step 402, the radiotelephone enters call mode and conducts a two way communication with a base site.

Step 404 and step 406 occur continuously and independently of the rest of the method. At step 404, the receiver searcher 114 uses the matched filter 128 to look for matches between the detected PN sequence received in the data stream from the ADC 110 and a predetermined PN sequence stored at the radiotelephone 104. In step 406, the response of the matched filter 128 is stored in memory 130 or memory 132. In the illustrated embodiment, the response over a time duration of 26⅔ ms is double buffered, with the matched filter 128 storing the current search results in one set of memory locations while the controller 116 reads the previous search results from a second set of memory locations.

At step 408, the controller 116 reads the response produced by the matched filter 128 and assigns rake fingers of the rake receiver 112 to the strongest matched sets from base stations currently in communication with the radiotelephone 104. This decision is primarily dependent on the record of pilot channel energy stored by the matched filter. In one example, the radiotelephone 104 is in communication with a single base station, and receives a single strong ray from that base station. In that case, only a single receiver finger such as receiver finger 122 will be assigned to the ray. In another example, the radiotelephone 104 is in communication with a single base station but receives multiple rays from that base station. In that case, multiple receiver fingers are assigned to the multiple rays so long as the ray will provide usable energy for detection of the traffic channel. In yet another example, the radiotelephone 104 receives one or more rays from a first base station and one or more rays from a second base station. In that case, the radiotelephone 104 assigns receiver fingers to the strongest match set from the first base station and to the strongest match set from the second base station.

At step 410, the radiotelephone 104 determines if there are other strong matches from other bases stations with which the radiotelephone is not yet in communication. In particular, the radiotelephone 104 determines if the strength of the received ray is sufficient to warrant possible soft handoff with the other base station. If not, control returns to step 408 for maintenance of the receiver fingers by the controller 116. If there are strong matches from another base station, at step 412 the radiotelephone 104 sends a pilot strength message indicative of the received signal strength of the pilot signal at the radiotelephone 104. Also, persistent weak responses from base sites that the radiotelephone is communicating with will be reported in a pilot strength message. The pilot strength message is used by the communication system 100 for controlling soft handoff. Subsequently, control returns to step 408 for maintenance of the receiver fingers by the controller 116.

Figure 5:
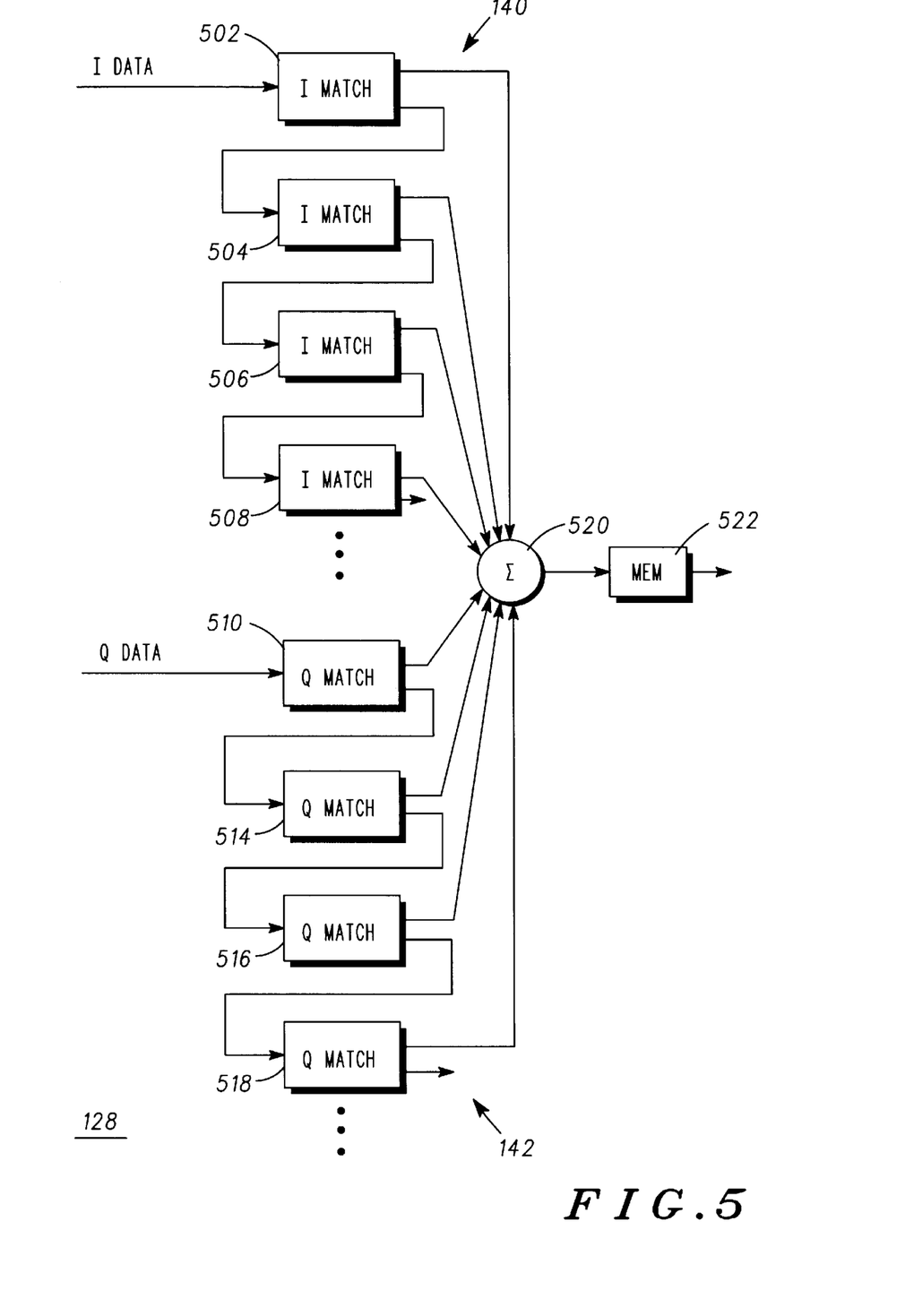
FIG. 5 is a block diagram of an alternative embodiment of the matched filter of FIG. 1.

FIG. 5 is a block diagram of an alternative embodiment of the matched filter 128 of FIG. 1. When the receiver searcher 114 looks for PN matches (step 206, FIG. 2), it is possible that a match of 512 chips will provide incorrect responses. This can occur when the RF frequency to which the receiver 104 is tuned is too far off of the RF frequency transmitted by the base site(s).

For tuning to a frequency, a radio such as the radiotelephone 104 conventionally includes a crystal oscillator. The crystal oscillator provides an output signal at a predetermined frequency which is used for tuning the analog front end 108. However, the output frequency of the crystal oscillator varies with factors such as temperature and aging. This can lead to inaccuracies in tuning, so techniques have been developed to compensate for the variation. One example is by synchronizing to a received signal having a known frequency, for example from base station 102, after communication has begun between the radiotelephone 104 and the base station 102. Before CDMA system acquisition, the receiver 104 has only the frequency accuracy of its crystal oscillator. This accuracy is typically 2.5 parts per million; including both temperature and aging variation. At 900 MHz for example, he maximum frequency offset is 2250 Hz. This accuracy may cause a frequency offset between the tuned reception frequency at the radiotelephone 104 and the transmitted frequency at the base station 102.

Frequency offset causes a phase rotation of the modulation at a rate equal to the frequency offset. One hundred eighty degrees of phase rotation will turn a chip transmitted with a value of +1 into a chip received with a value of −1. Thus, when summing chips in the prior art searching method or when using a matched filter, there is a practical limit to the number of sequential chips that can be summed and matched.

With a 2250 Hz frequency offset, a phase rotation of 90 degrees will occur in 111.1 microseconds. A chip in an IS-95 based system has a time length of 0.8138 microseconds. Thus, 136.5 chip times occur in 111.1 microseconds, so 136 chips could be safely summed or matched while maintaining phase coherence.

If 512 chips are to be matched, then the maximum frequency offset for 90 degrees of phase rotation is 600 Hz. This requirement is easily met after CDMA system acquisition and locking of the tuning frequency of the receiver 104 to the base station's transmission frequency. However, before system acquisition, to obtain the match response accuracy of 512 chips with greater than 600 Hz of frequency offset, other provisions are necessary.

In FIG. 5, I filter 140 comprises multiple matched filters, including matched filter 502, matched filter 504, matched filter 506 and matched filter 508. Similarly, Q filter 142 comprises multiple matched filters, including matched filter 510, matched filter 514, matched filter 516 and matched filter 518. The first matched filter in each set, matched filter 502 of I filter 140 and matched filter 510 of Q filter 142, has an input coupled to the ADC 110 for receiving the I PN sequence and the Q PN sequence, respectively. Subsequent matched filters in each set each have an input coupled to an output of the previous matched filter to receive the detected PN sequence at a subsequent time for matching.

Each matched filter compares a portion of the detected PN sequence and a predetermined PN sequence and produces a respective response. Each matched filter has a respective output coupled to a summing element 520. The summing element 520 combines the respective filter responses to produce a total response. The total response is stored in the memory 522.

In the illustrated embodiment, the I filter 140 and the Q filter 142 each comprise four matched filters. Any number of matched filters could, of course, be provided, depending of acceptable levels of hardware complexity, the number of chips to be matched, and other factors. If four matched filters are provided and 512 chips are to be matched, the first-received 128 chips of the detected I PN sequence are matched in matched filter 508, the second-received 128 chips of the I PN sequence are matched in matched filter 506, the third-received 128 chips of the I PN sequence are matched in matched filter 504, and the last-received 128 chips of the I PN sequence are matched in the matched filter 502. Similarly, for the Q PN sequence, the first-received 128 chips of the detected Q PN sequence are matched in matched filter 518, the second-received 128 chips of the Q PN sequence are matched in matched filter 516, the third-received 128 chips of the Q PN sequence are matched in matched filter 514, and the last-received 128 chips of the Q PN sequence are matched in the matched filter 510. Received chips are clocked sequentially through the matched filters using, for example, the chip clock signal. At each clock time, the summing element 520 provides the response to the memory 522. Thus, the matched filter is split into multiple matched filters with short chip match lengths to obtain match response accuracy of 512 chips in the presence of frequency offset greater than 600 Hz.

A second alternative embodiment for maintaining the match response accuracy of, for example, 512 chips in the presence of excessive frequency offset is the use of shorter chip length matched filters whose outputs from successive 26⅔ milliseconds PN sequence times are combined. For example, referring again to the embodiment illustrated in FIG. 1, to match 512 chips using this alternative embodiment, each of I filter 140 and Q filter 142 is 128 chips in length. During a first 26⅔ milliseconds PN sequence time, a first 128 chips are matched by each filter and the response stored. During a second 26⅔ milliseconds PN sequence time, a second 128 chips are matched by each filter and the response stored or combined with the first response. A third and a fourth 128 chips are subsequently matched and the responses combined with the first and second responses to produce the total response. Thus, the matched filter combines the response from a predetermined number of successive matches to produce the total response.

The second alternative embodiment provides similar accuracy to the accuracy of the embodiment illustrated in FIG. 5. The second alternative embodiment provides for reduced hardware complexity, but matching takes approximately four times as long, or 4×26⅔ milliseconds=106⅔ milliseconds. This performance is still satisfactory during the initial process of CDMA system acquisition.

As can be seen from the foregoing, the present invention provides method and apparatus for fast pilot channel acquisition using a matched filter in a mobile station. The receiver searcher 114 includes a matched filter 128 for comparing detected PN sequences with a predetermined PN sequence and storing the result of the comparison. The comparison may be completed every 26⅔ ms, corresponding to the repetition rate of the base station PN sequences for the I and Q channels. The comparison is repeated continuously, independent of other processes in the mobile station. Using this process, CDMA energy may be reliably detected within the 26⅔ ms search time and receiver fingers assigned, greatly reducing the search time required by conventional receiver searchers. The process also improves performance of the mobile station during idle mode handoff, slotted mode operation and soft handoff by reducing the pilot channel search time.

While a particular embodiment of the present invention has been shown and described, modifications may be made. It is therefore intended in the appended claims to cover all such changes and modifications which fall within the true spirit and scope of the invention.

What is claimed is:

1. A radiotelephone configured to receive DS-CDMA signals in a communication system including a plurality of base stations, each base station being identified by a unique starting phase of a known pseudorandom noise (PN) sequence, the radiotelephone comprising:

a rake receiver having a plurality of receiver fingers;

a receiver searcher for detecting pilot signals from the plurality of base stations, wherein the pilot signals are quadrature modulated, each of the pilot signals including in-phase (I) symbols and quadrature-phase (Q) symbols, wherein the I symbols are spread using an I PN sequence and the O symbols are spread using a Q PN sequence, the receiver searcher including a matched filter for comparing a detected PN sequence and a predetermined PN sequence and producing a response, wherein the matched filter includes an I filter for comparing a detected I PN sequence and a stored I PN sequence, and a Q filter for comparing a detected Q PN sequence and a stored Q PN sequence; and a controller coupled to the receiver searcher and the rake receiver, the controller including a memory for storing the response as a stored response, the controller controlling the plurality of receiver fingers in response to the stored response.

2. A radiotelephone as recited in claim 1 wherein the radiotelephone further comprises a storage element which stores a fixed pattern, the predetermined PN sequence including the fixed pattern.

3. A radiotelephone as recited in claim 2 wherein the fixed pattern comprises a predetermined number of chips of a PN sequence.

4. A radiotelephone as recited in claim 3 wherein the fixed pattern comprises 512 last chips of a PN sequence.

5. A radiotelephone as recited in claim 1 wherein the controller provides a variable pattern to the receiver searcher, the predetermined PN sequence including the variable pattern.

6. A radiotelephone as recited in claim 5 wherein the variable pattern comprises a predetermined number of chips of a PN sequence.

7. A radiotelephone as recited in claim 6 wherein the variable pattern comprises 512 last chips of a PN sequence.

8. A radiotelephone as recited in claim 1 wherein the Q filter is for comparing the detected Q PN sequence and the stored Q PN sequence and producing the response.

9. A radiotelephone as recited in claim 8 wherein a portion of the stored I PN sequence comprises a first fixed pattern and a portion of the stored Q PN sequence comprises a second fixed pattern.

10. A radiotelephone as recited in claim 9 wherein the first fixed pattern comprises 512 last chips of an I PN sequence and wherein the second fixed pattern comprises 512 last chips of a Q PN sequence.

11. A radiotelephone as recited in claim 1 wherein the controller determines presence of DS-CDMA signals based on the response.

12. A radiotelephone as recited in claim 1 wherein the matched filter combines the response from a predetermined number of successive matches to produce a total response, the controller controlling the plurality of receiver fingers in response to the total response.

13. A radiotelephone as recited in claim 1 wherein the controller is configured to identify a strongest DS-CDMA pilot signal based on the response, the controller initiating communication with a base station identified by the strongest DS-CDMA pilot signal.

14. A radiotelephone as recited in claim 1 wherein the radiotelephone is maintained in a low-power mode periodically interrupted by an active mode, the controller identifying a strongest DS-CDMA pilot signal based on the response upon entering the active mode.

15. A radiotelephone as recited in claim 14 wherein the receiver searcher is configured to detect one or more rays originating from a base station, the controller identifying one or more strongest rays based on the response, the controller assigning respective receiver fingers to the one or more strongest rays for detecting a paging channel transmitted by the base station.

16. A radiotelephone as recited in claim 1 wherein the controller is configured to identify a strongest ray from a base station based on the response, the controller assigning a receiver finger to the strongest pilot signal, the controller subsequently identifying one or more other strong pilot signals from the base station based on the response, the controller assigning one or more respective receiver fingers to the one or more strong rays.

17. A radiotelephone as recited in claim 16 wherein the matched filter compares subsequently detected PN sequences and the predetermined PN sequence and produces a subsequent response, the controller identifying the one or more strong rays from the base station based on the subsequent response.

18. A radiotelephone as recited in claim 1 wherein the I filter is for comparing the detected I PN sequence and the stored I PN sequence and producing the response.

19. A radiotelephone as recited in claim 1 wherein the matched filter includes a summing element for combining an I filter response and a Q filter response and producing a total response, the controller controlling the plurality of receiver fingers in response to the total response.

20. A radiotelephone configured to receive DS-CDMA signals in a communication system including a plurality of base stations, each base station being identified by a unique starting phase of a known pseudorandom noise (PN) sequence, the radiotelephone comprising:

a rake receiver having a plurality of receiver fingers;

a receiver searcher for detecting pilot signals from the plurality of base stations, the receiver searcher including a matched filter for comparing a detected PN sequence and a predetermined PN sequence and producing a response, and wherein the matched filter comprises a comparator for suppressing the response when the response does not exceed a predetermined threshold; and a controller coupled to the receiver searcher and the rake receiver, the controller including a memory for storing the response as a stored response, the controller controlling the plurality of receiver fingers in response to the stored response.

21. A radiotelephone configured to receive DS-CDMA signals in a communication system including a plurality of base stations, each base station being identified by a unique starting phase of a known pseudorandom noise (PN) sequence, the radiotelephone comprising:

a rake receiver having a plurality of receiver fingers;

a receiver searcher for detecting pilot signals from the plurality of base stations, the receiver searcher including a matched filter for comparing a detected PN sequence and a predetermined PN sequence and producing a response, and wherein the matched filter comprises multiple matched filters and a summing element, each matched filter comparing a portion of the detected PN sequence and a predetermined PN sequence and producing a filter response, the summing element combining respective filter responses to produce a total response, the controller controlling the plurality of receiver fingers in response to the total response; and a controller coupled to the receiver searcher and the rake receiver, the controller including a memory for storing the response as a stored response, the controller controlling the plurality of receiver fingers in response to the stored response, wherein the controller determines presence of DS-CDMA signals based on the response.

22. A radiotelephone configured to receive DS-CDMA signals in a communication system including a plurality of base stations, each base station being identified by a unique starting phase of a known pseudorandom noise (PN) sequence, the radiotelephone comprising:

a rake receiver having a plurality of receiver fingers;

a receiver searcher for detecting pilot signals from the plurality of base stations, the receiver searcher including a matched filter for comparing a detected PN sequence and a predetermined PN sequence and producing a response, and wherein the receiver searcher is configured to detect a plurality of pilot signals from a like plurality of base stations, the controller identifying two or more strongest pilot signals based on the response, the controller assigning respective receiver fingers to the two or more strongest pilot signals for controlling soft handoff while receiving a traffic channel from the plurality of base stations; and a controller coupled to the receiver searcher and the rake receiver, the controller including a memory for storing the response as a stored response, the controller controlling the plurality of receiver fingers in response to the stored response.

23. A method for detecting DS-CDMA signals in a communication system, the method comprising the steps of:

exiting a low-power mode and entering an active mode;

detecting pilot signals, each of the pilot signals being covered by a respective short pseudorandom noise (PN) sequence, wherein the pilot signals are quadrature modulated, each of the pilot signals including in-phase (I) symbols and quadrature-phase (Q) symbols, wherein the I symbols are spread using an I PN sequence and the Q symbols are spread using a Q PN sequence;

using a matched filter, comparing each short PN sequence and a predetermined PN sequence comprising the sub-steps of comparing a detected I PN sequence and a stored I PN sequence, and comparing a detected Q PN sequence and a stored Q PN sequence;

when a short PN sequence matches the predetermined PN sequence, producing a match signal;

in response to the match signal, assigning rake receiver fingers to a strongest match set; and detecting a paging channel transmitted by a base station.

24. A method for detecting DS-CDMA signals as recited in claim 23, the method further comprising the steps of:

in response to the match signal, determining a DS-CDMA system is present;

obtaining a synchronization channel corresponding to the short PN sequence; and initiating communication with a base station in the communication system, the base station transmitting the synchronization channel.

25. A method for detecting DS-CDMA signals as recited in claim 23 wherein the predetermined PN sequence comprises a fixed pattern.

26. A method for detecting DS-CDMA signals as recited in claim 23 wherein the predetermined PN sequence comprises a variable pattern.

* * * * *